United States Patent [19]

Kawasaki

[11] Patent Number: 4,910,587
[45] Date of Patent: Mar. 20, 1990

[54] INFORMATION SIGNAL PROCESSING APPARATUS

[76] Inventor: Somei Kawasaki, 2-9-2, Himonya, Meguro-ku, Tokyo, Japan

[21] Appl. No.: 256,036

[22] Filed: Oct. 11, 1988

[30] Foreign Application Priority Data

Nov. 18, 1987 [JP] Japan ................................. 62-289433

[51] Int. Cl.$^4$ ........................ H04N 9/47; H04N 9/86; H04N 11/22
[52] U.S. Cl. ......................................... 358/18; 358/11
[58] Field of Search .................................... 358/18, 11

[56] References Cited

U.S. PATENT DOCUMENTS 4,623,914  11/1986  Kuribayashi ........................... 358/18

Primary Examiner—John W. Shepperd

[57] ABSTRACT

An apparatus for processing a sequential information signal in which a plurality of kinds of information signals having different offset levels according to the kind of information are sequentially allocated at a predetermined period. When the sequential information signal is input, the offset levels of information signals constituting the sequential information signal are each detected in synchronization with first timing signals generated in synchronization with a second timing signal. On the basis of the result of detection, it is determined whether there is any abnormality in the sequential information signal, and, in accordance with the result of this detection, the action for generating the first timing signals is controlled. By virtue of this arrangement, even when an abnormality has occurred in the input sequential information signal, it is possible to stably discriminate the kind of each information signal constituting the sequential information signal.

10 Claims, 6 Drawing Sheets

INFORMATION SIGNAL PROCESSING APPARATUS

BACKGROUND OF THE INVENTION

1. Field of the Invention

The present invention relates to an information signal processing apparatus for processing an information signal in which a plurality of kinds of signals having offset levels that are different from each other are sequentially allocated.

2. Description of the Related Art

An apparatus for processing an information signal in which a plurality of kinds of signals having different offset levels are sequentially allocated has hitherto been known as, for example, a still-image recording and reproducing apparatus.

In such a still-image recording and reproducing apparatus, color information expressed by the use of two color-difference signals R-Y and B-Y is converted into a color-difference line-sequential signal in which an R-Y signal and a B-Y signal alternately appear every horizontal scanning period, and the information is recorded on a recording medium.

FIG. 1 shows the frequency spectral distribution of signals which have been recorded in this way on a recording medium.

As shown in this figure, an R-Y signal in the color-difference line-sequential signal and a B-Y signal in the same are provided with a certain offset so that they are frequency-modulated in such a manner as to be centered at a frequency f1, e.g. 1.2 MHz, and a frequency f2, e.g. 1.3 MHz, respectively.

On the other hand, a luminance signal is frequency-modulated in such a manner as to have a deviation in which the sync. tip portion is at a frequency f3, e.g. 6.0 MHz, and the white peak portion is at a frequency f4, e.g. 7.5 MHz. An example of the arrangement of the still-image recording and reproducing apparatus is shown in FIG. 2.

In FIG. 2, during recording, a luminance signal which has been clamped by a clamping circuit (not shown) is frequency-modulated by a frequency modulator 1 in such a manner as to have the above-described deviation. Two color-difference signals R-Y and B-Y are converted into a color-difference line-sequential signal by a color-difference line-sequential conversion circuit 2 and are provided with a certain offset, and are then frequency-modulated by a frequency modulator 3.

The thus frequency-modulated luminance signal and color-difference line-sequential signal are added to each other by an adder 4, they pass through a recording amplifier 5 and a recording/reproducing head changeover switch 6 which is connected, during recording, to the R side shown in the figure, and they are then recorded on a magnetic sheet 8 by a magnetic head 7. At this time, the magnetic sheet 8 is rotated by a motor 9 at, for example, the field frequency, and the magnetic head 7 is radially moved, whereby a still-image signal is recorded on concentric recording tracks on the magnetic sheet 8, field by field.

During reproduction, a still-image signal is reproduced from the magnetic sheet 8 by the magnetic head 7, it passes through the recording/reproducing head changeover switch 6 which is connected, during reproducing, to the P side shown in the figure, and it is then amplified by a reproducing amplifier 10. Subsequently, a high-pass filter (HPF) 11 separates only frequency-modulated luminance signal components, and a frequency demodulator 13 demodulates a luminance signal. On the other hand, a low-pass filter 12 separates only frequency-modulated color-difference line-sequential signal components, a frequency demodulator 14 demodulates a color-difference line-sequential signal, and a color-difference simultaneous conversion circuit 15 converts the signal into two simultaneous color-difference signals (R-Y, B-Y).

FIG. 3 shows an example of the arrangement of the color-difference simultaneous conversion circuit 15 shown in FIG. 2.

FIG. 4 is a timing chart showing signals output from various parts of the color-difference simultaneous conversion circuit 15.

In FIG. 3, a reproduced color-difference line-sequential signal which has been output from the frequency demodulator 14 is supplied to sampling circuits 18 and 19 in which offset levels within the horizontal blanking periods are sampled in correspondence with alternate horizontal lines and in synchronization with sampling pulses C and D, respectively, which are generated by a pulse generating circuit 50. The color-difference line-sequential signal input to the circuit 15 is also supplied to clamping circuits 16 and 17 in which an R-Y signal and a B-Y signal are clamped at the same current potential in synchronization with clamping pulses A and B, respectively, which are generated by the pulse generating circuit 50. Subsequently, one of signals output from the clamping circuits 16 and 17 is selected by a switch 20. As a result, the offsets in the input color-difference line-sequential signal are removed.

Subsequently, the output of the switch 20 is input to a 1H delay line 21 and switches 22 and 23. The output of the 1H delay line 21 and the output of the switch 20 are selectively output by the switches 22 and 23 in accordance with a pulse E output from the pulse generating circuit 50, as simultaneously converted R-Y and B-Y signals, respectively.

FIG. 5 shows an example of a known arrangement of the pulse generating circuit 50 shown in FIG. 3.

In FIG. 3, a comparator 24 compares the level of a color-difference signal which has been sampled by the sampling circuit 18 and is held by a capacitor C1 with the level of a color-difference signal which has been sampled by the other sampling circuit 19 and is held by another capacitor C2, and a signal F in accordance with the result of this comparison is output from the comparator 24. The signal F is supplied to an EX OR gate 26-3 shown in FIG. 5. On the other hand, a horizontal synchronizing signal separation circuit 25 in FIG. 5 separates the horizontal synchronizing signal (H SYNC) from the reproduced luminance signal Y. The horizontal synchronizing signal is then frequency-demultiplied by a D-type flip-flop 27 and is output therefrom as a pulse. This pulses output from the flip-flop 27 and the signal F supplied from the comparator 24 and expressing the result of comparison performed therein are then input to the EX OR gate 26-3. If, for instance, it is assumed that, when an R-Y signal is sampled by the sampling circuit 18, the comparator 24 outputs a low-level pulse, whereas, when a B-Y signal is sampled by the sampling circuit 19, the comparator 24 outputs a high-level pulse, the EX OR gate 26-3 outputs a pulse E shown in FIG. 4. This pulse E is then supplied to an inverter 26-5 and an AND gate 26-4, and the AND gate 26-4 and an AND gate 26-6 output a pulse B for clamping the B-Y signal and a pulse A for clamping the R-Y signal, respectively.

Further, in the pulse generating circuit 50, a BF (buffer flag) signal generating circuit 26 generates a pulse BF, shown in FIG. 4, in synchronization with a horizontal synchronizing signal, and the BF pulse is supplied to AND gates 26-1 and 26-2. In this way, sampling pulses C and D for sampling the R-Y and B-Y signals are formed, and they are supplied to the sampling circuits 18 and 19, respectively.

With the above-described known arrangement of the pulse generating circuit 50 of the color-difference simultaneous conversion circuit 15, however, two kinds of sampling pulses, two kinds of clamping pulses, and one kind of pulse for changing over the switches 20, 22 and 23 are formed; that is, pulses of five kinds in all are formed. Thus, the circuit arrangement has been inevitably complicated for generating these pulses.

SUMMARY OF THE INVENTION

A primary object of the present invention is to provide an information signal processing apparatus capable of solving the above-described problems.

Another object of the present invention is to provide an information signal processing apparatus which is capable of stably discriminating the kind of each information signal constituting a sequential information signal, even when an abnormality occurs in the sequential information signal.

To this end, according to the present invention, an aspect thereof provides an information signal processing apparatus for processing a sequential information signal in which a plurality of kinds of information signals having different offset levels according to the kind of information are sequentially allocated at a predetermined period. The apparatus comprises: offset level discriminating means, arranged to input the sequential information signal, for detecting each of the offset levels of the plurality of kinds of information signals constituting the sequential information signal in synchronization with first timing signals, and for outputting an offset level discrimination signal in accordance with the result of detection; timing signal generating means for generating the first timing signals in synchronization with a second timing signal; and control means, arranged to input the offset level discrimination signal output from the offset level discrimination means, for determining whether there is any abnormality in the sequential information signal on the basis of the offset level discrimination signal, and for controlling the timing signal generating means according to the result of determination.

A further object of the present invention is to provide a color-difference line-sequential signal processing apparatus which is capable of performing simultaneous conversion of a color-difference line-sequential signal and of outputting the same, while requiring only a simple structure.

To this end, according to the present invention, another aspect thereof provides a color-difference line-sequential signal processing apparatus for processing a color-difference line-sequential signal in which a first color-difference signal having a first signal level during a predetermined period and a second color-difference signal having a second signal level different from the first signal level during a predetermined period are alternately allocated every horizontal scanning period. The apparatus comprises: discrimination means, arranged to input the color-difference line-sequential signal, for detecting, in synchronization with first timing signals, the signal levels of the first and second color-difference signals constituting the color-difference line-sequential signal during the predetermined periods to discriminate whether or not the first color-difference signal and the second color-difference signal are alternately input, and for outputting a discrimination signal according to the result of discrimination; level correction means, arranged to input the color-difference line-sequential signal, for correcting, in synchronization with the first timing signals, the signal levels of the first and second color-difference signals constituting the color-difference line-sequential signal, and for outputting the first and second color-difference signals subjected to level-correction; simultaneous conversion means for converting, by the use of one of second timing signals, the first and second color-difference signals of the color-difference line-sequential signal which have been subjected to level-correction by the level correction means into simultaneous color-difference signals; second timing signal generating means for generating the second timing signals in synchronization with the horizontal scanning period; first timing signal generating means for generating the first timing signals by the use of the second timing signals generated by the second timing signal generating means; and control means, arranged to input the discrimination signal output from the discrimination means, for determining whether there is any abnormality in the color-difference line-sequential signal on the basis of the discrimination signal, and for controlling the second timing signal generating means according to the result of determination.

The above and other objects and features of the invention will become apparent from the following detailed description of embodiments thereof taken in connection with the accompanying drawings.

DETAILED DESCRIPTION OF THE PREFERRED EMBODIMENT

The present invention will be described hereunder in detail with respect to an embodiment thereof.

According to the present invention, the following arrangements are made, based on the fact that, in a color-difference line-sequential signal, an R-Y signal and a B-Y signal alternate with each other every horizontal scanning period: each of the two color-difference signals R-Y and B-Y is clamped in accordance with two kinds of control signals produced on the basis of the horizontal synchronizing signal, thus making it unnecessary to provide a circuit for discriminating the color-difference signals; further, a circuit which discriminates the color-difference signals by detecting their offset levels, such as those described before, is used to detect any abnormality in the color-difference line-sequential signal, such as abnormality in the sequence and the level of the R-Y and B-Y signals.

Figure 6:
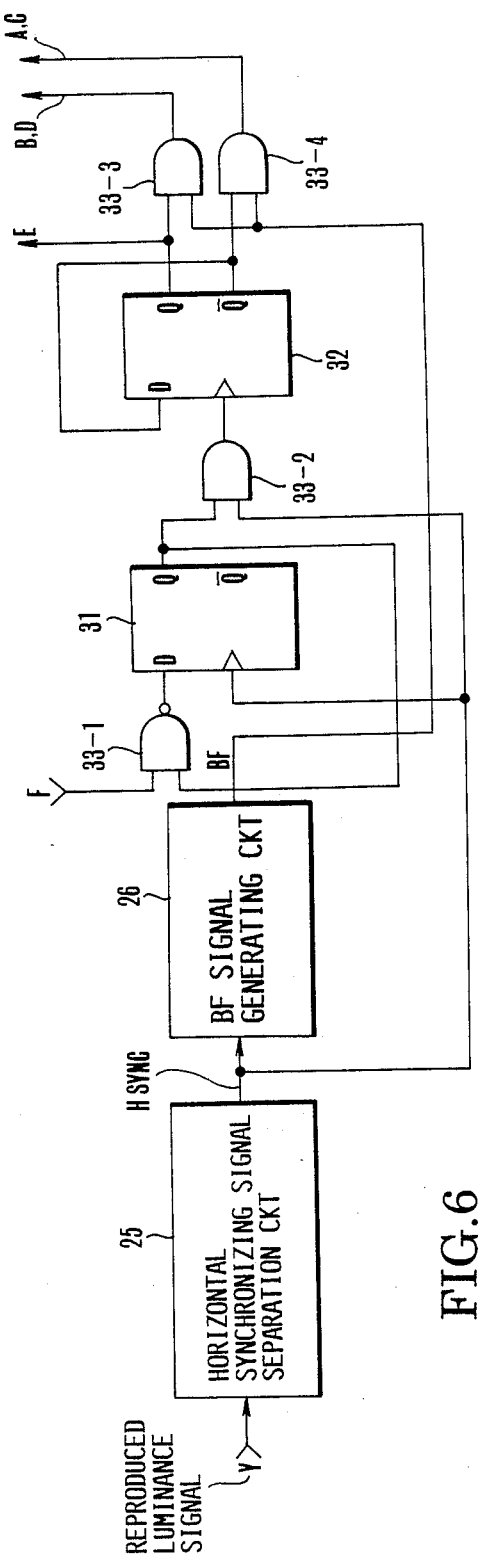
FIG. 6 is a block diagram schematically showing the arrangement of a pulse generating circuit in a color-difference simultaneous conversion circuit of an apparatus in accordance with the present invention.

FIG. 6 shows an example of the arrangement of a pulse generating circuit in a color-difference simultaneous conversion circuit of the apparatus in accordance with the present invention.

Figure 5:
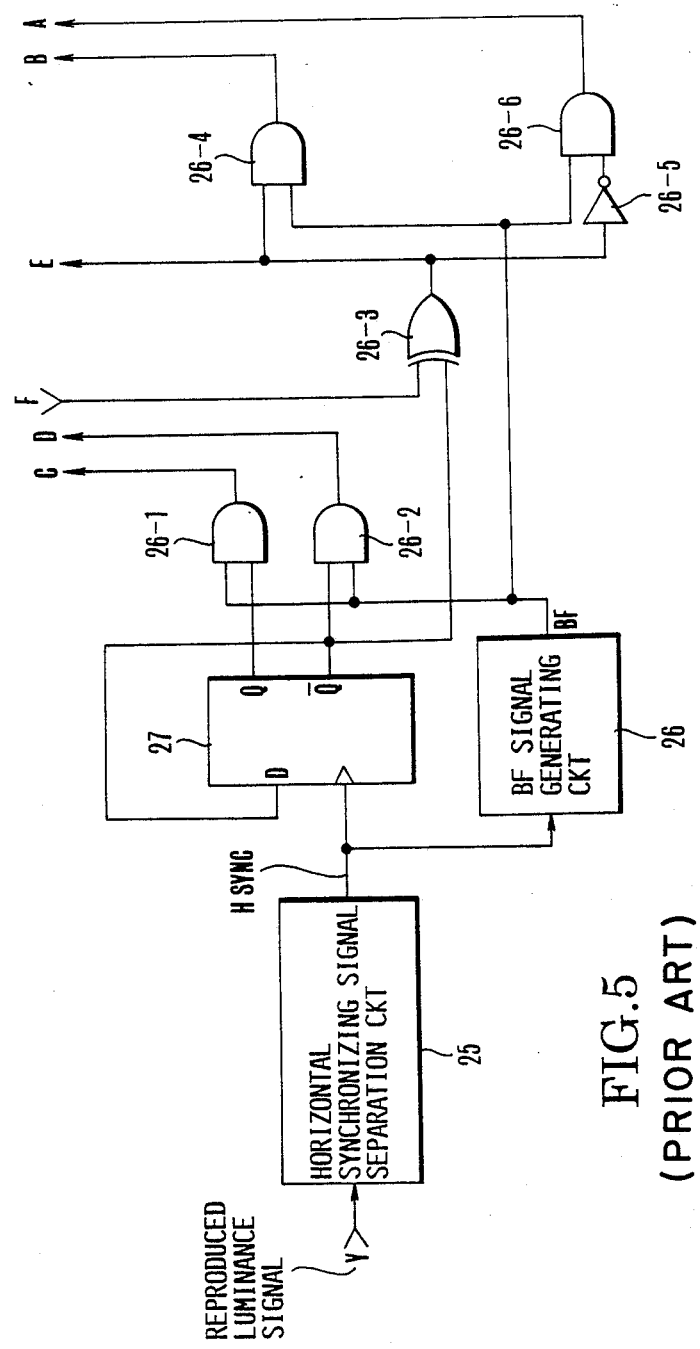
FIG. 5 is a block diagram showing an example of the arrangement of a pulse generating circuit shown in FIG. 3.

In FIG. 6, parts which are the same as those in the arrangement shown in FIG. 5 are denoted by the same reference numerals.

As shown in the figure, the pulse generating circuit has a NAND gate 33-1 to which a pulse F output from the comparator 24 and the Q output of a D-type flip-flop 31 are input. The D terminal of the flip-flop 31 is supplied with the output of the NAND gate 33-1, and the clock terminal of the same is supplied with the horizontal synchronizing signal output from a horizontal synchronizing signal separation circuit 25. The pulse generating circuit also has an AND gate 33-2 of which one input terminal is supplied with the output from the Q terminal of the D-type flip-flop 31.

The other input terminal of the AND gate 33-2 is supplied with the horizontal synchronizing signal which has been separated by the horizontal synchronizing signal separation circuit 25. The output of the AND gate 33-2 is supplied to the clock terminal of another D-type flip-flop 32. The output from the $\overline{Q}$ terminal of this flip-flop 32 is supplied to its D terminal.

Figure 1:
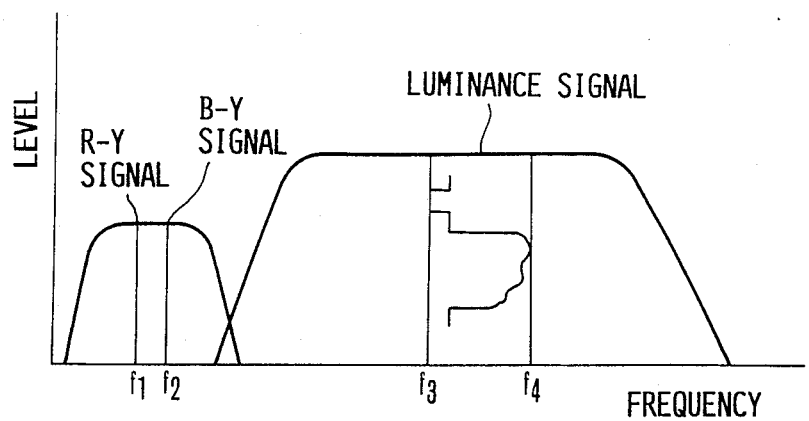
FIG. 1 is a view showing the frequency spectrum of a still-image signal recorded on a recording medium by a still-image recording and reproducing apparatus.
Figure 2:
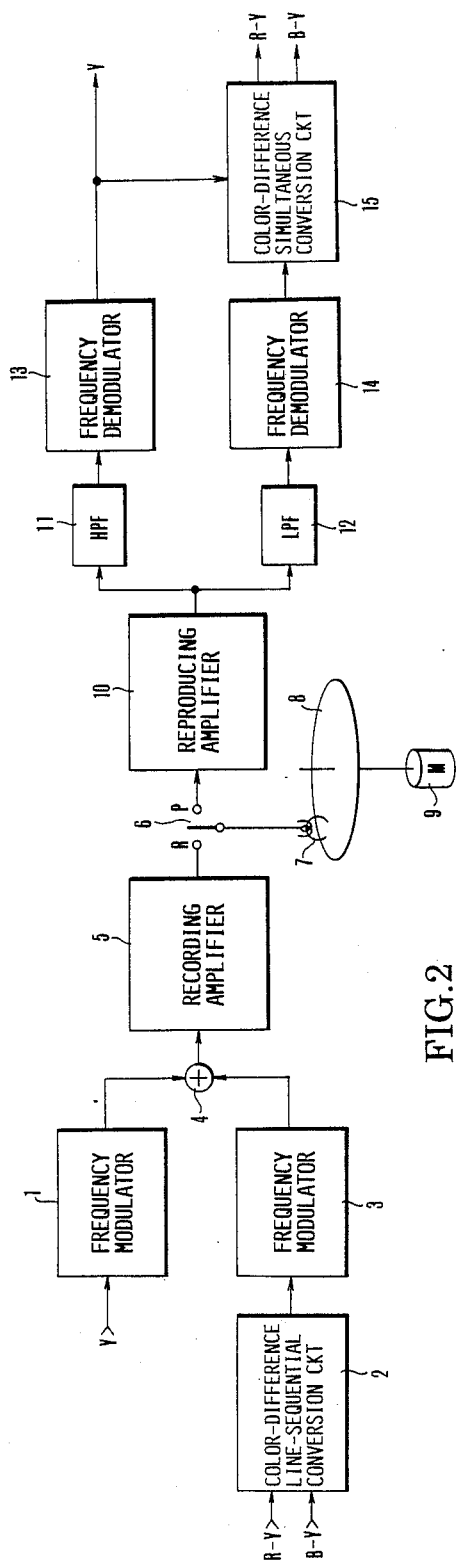
FIG. 2 is a block diagram schematically showing the arrangement of the still-image recording and reproducing apparatus.
Figure 3:
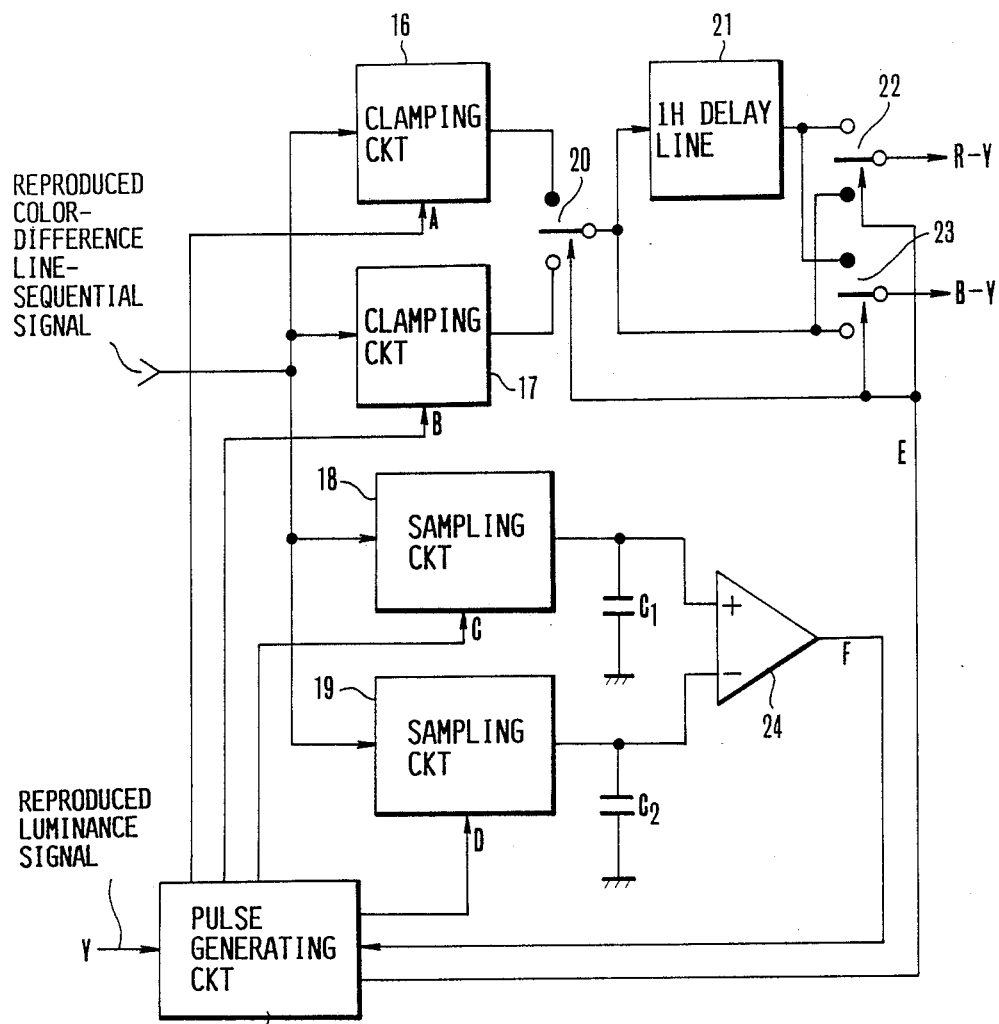
FIG. 3 is a block diagram showing an example of the arrangement of a color-difference simultaneous conversion circuit shown in FIG. 2.

The output from the Q terminal of the D-type flip-flop 32 serves as a pulse E for controlling switches 20, 22, and 23 which is the same as that described before with reference to FIG. 3. This Q output of the flip-flop 32 is also supplied to an AND gate 33-3 to serve as a clamping pulse B and a sampling pulse D upon passing through the gate 33-3. The $\overline{Q}$ output of the flip-flop 32 is supplied to an AND gate 33-4 to serve as a clamping pulse A and a sampling pulse C upon passing through the gate 33-4.

Figure 4:
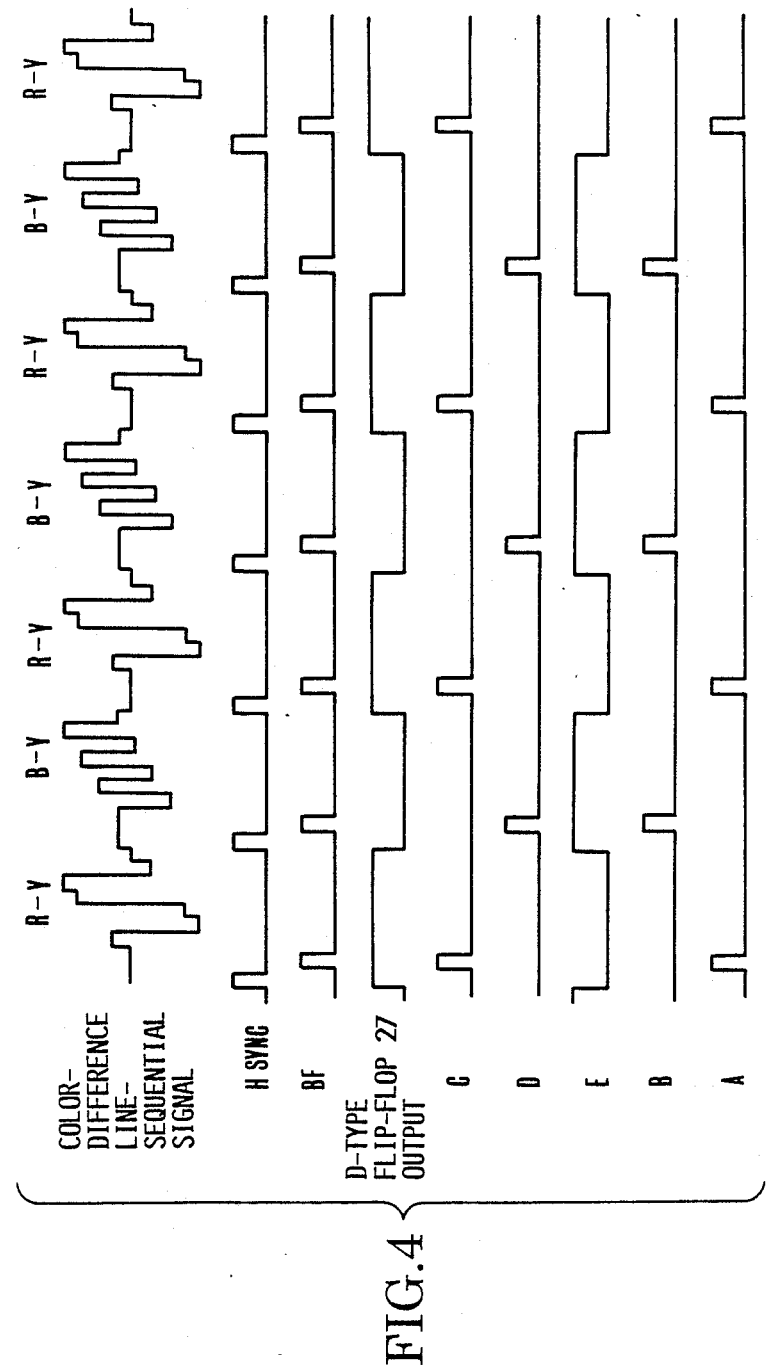
FIG. 4 is a timing chart showing signals output from various parts of the color-difference simultaneous conversion circuit shown in FIG. 3.

With the above-described arrangement, when a color-difference line-sequential signal input to the color-difference simultaneous conversion circuit has R-Y and B-Y signals which regularly appear and which have predetermined levels and simultaneously when the output F of the comparator 24 (in FIG. 3) is held at, for instance, the low-level, the output from the Q terminal of the D-type flip-flop 31 goes high. Since the clock terminal of the other flip-flop 32 is always supplied with the horizontal synchronizing signal via the AND gate 33-2, the Q terminal of the D-type flip-flop 32 generates the pulse E in which a high-level and a low-level alternately appear every horizontal scanning period, with the above-described condition of the color-difference line-sequential signal. Further, the Q terminal and the $\overline{Q}$ terminal of the D-type flip-flop 32 produce outputs which, upon passing through the AND gates 33-3 and 33-4, respectively, in synchronization with the generation of a BF signal generated by a BF signal generating circuit 26, serve as the clamping pulse B and the sampling pulse D for the B-Y signal, and the clamping pulse A and the sampling pulse C for the R-Y signal, respectively. These pulses are generated in the manner shown in FIG. 4. When the level of the pulse F output from the comparator 24 (shown in FIG. 3) is at the low-level, i.e., when the sampling circuit 18 (shown in FIG. 3) samples an R-Y signal, the circuit is brought into a stable condition. Even if the level of pulse F output from the comparator 24 erroneously goes high due to a factor such as drop-out, since the Q output of the D-type flip-flop 31 does not go to the low-level, it is possible to prevent erroneous operation in the event that any abnormality has occurred in the color-difference line-sequential signal. Specifically, if, in such a case, the Q output of the D-type flip-flop 31 should go to the low-level, the supply of clock pulse to the other D-type flip-flop 32 will be prevented. As a result, either a sampling pulse C or a sampling pulse D will not be output, resulting in a condition in which the output of the sampling circuit 18 or 19 is not renewed. This would lead to erroneous detection of the offset levels.

In contrast, according to the present invention, by virtue of the provision of the NAND gate 33-1, even when the level of the pulse F output from the comparator 24 erroneously goes high due to drop-out or the like, the Q output of the D-type flip-flop 31 is able to change its level condition every horizontal scanning period, thereby making it possible to prevent the above-described erroneous operation.

Further, the pulse generating circuit according to this embodiment of the present invention is adapted to output only three kinds of timing pulses. This makes it possible to reduce the required number of terminals from a conventionally required number when the pulse generating circuit is to be made into an integrated circuit.

Furthermore, according to the present invention, a clamping pulse is formed by the use of a pulse output by the comparator 24 which confirms that the R-Y signal and the B-Y signal, provided with offsets, appear in regular sequence and are generated at regular timings. This arrangement makes it possible to use a clamping pulse also as a sampling pulse.

As has been described above, according to the present invention, when two kinds of color-difference signals, i.e. R-Y and B-Y signals, allocated with offsets in a color-difference line-sequential signal, are to be converted into simultaneous color-difference signals, it is possible to make each of two kinds of timing pulses to serve both as sampling pulses used to detect the offset levels and as clamping pulses used to remove the offsets. Therefore, the number of kinds of pulses generated by the pulse generating circuit can be reduced. This feature is advantageous in reducing the required number of terminals when the pulse generating circuit is made into an integrated circuit.

What is claimed is:

1. An information signal processing apparatus for processing a sequential information signal in which a plurality of kinds of information signals having different offset levels according to the kind of information are sequentially allocated at a predetermined period, said apparatus comprising:
   (A) offset level discriminating means, arranged to input said sequential information signal, for detecting each of the offset levels of said plurality of kinds of information signals constituting said sequential information signal in synchronization with first timing signals, and for outputting an offset level discrimination signal in accordance with the result of detection;

(B) timing signal generating means for generating said first timing signals in synchronization with a second timing signal; and (C) control means, arranged to input said offset level discrimination signal output from said offset level discrimination means, for determining whether there is any abnormality in said sequential information signal on the basis of said offset level discrimination signal, and for controlling said timing signal generating means according to the result of determination.

2. An information signal processing apparatus according to claim 1, wherein said timing signal generating means includes:

(A) third-timing-signal generating means for generating third timing signals by the use of said second timing signal;

(B) input control means for determining whether or not said second timing signal is supplied to said third-timing-signal generating means;

(C) fourth-timing-signal generating means, arranged to input said second timing signal, for generating a fourth timing signal that is different in phase from said input second timing signal; and (D) first-timing-signal forming means for forming and outputting said first timing signals by the use of said third timing signals output from said third-timing-signal generating means and said fourth timing signal output from said fourth-timing-signal generating means.

3. An information signal processing apparatus according to claim 2, wherein said control means is arranged to input said offset level discrimination signal output from said offset level discrimination means, to determine, on the basis of said input offset level discrimination signal, whether there is any abnormality in said sequential information signal, and to control said input control means in such a manner that, when an abnormality has been detected, said input control means prevents the supply of said second timing signal.

4. An information signal processing apparatus according to claim 1, further comprising level correction means, arranged to input said sequential information signal, for correcting each of the offset levels of said plurality of kinds of information signals constituting said sequential information signal in synchronization with said first timing signals.

5. An information signal processing apparatus according to claim 2, further comprising:

(A) level correction means, arranged to input said sequential information signal, for correcting each of the offset levels of said plurality of kinds of information signals constituting said sequential information signals in synchronization with said first timing signals; and (B) simultaneous conversion means for converting, by the use of one of said third timing signals, said plurality of kinds of information signals of said sequential information signal which have been subjected to level-correction by said level correction means into simultaneous information signals.

6. A color-difference line-sequential signal processing apparatus for processing a color-difference line-sequential signal in which a first color-difference signal having a first signal level during a predetermined period and a second color-difference signal having a second signal level different from said first signal level during a predetermined period are alternately allocated every horizontal scanning period, said apparatus comprising:

(A) discrimination means, arranged to input said color-difference line-sequential signal, for detecting, in synchronization with first timing signals, the signal levels of said first and second color-difference signals constituting said color-difference line-sequential signal during the predetermined periods to discriminate whether or not said first color-difference signal and said second color-difference signal are alternately input, and for outputting a discrimination signal according to the result of discrimination;

(B) level correction means, arranged to input said color-difference line-sequential signal, for correcting, in synchronization with said first timing signals, the signal levels of said first and second color-difference signals constituting said color-difference line-sequential signal, and for outputting said first and second color-difference signals subjected to level-correction;

(C) simultaneous conversion means for converting, by the use of one of second timing signals, said first and second color-difference signals of said color-difference line-sequential signal which have been subjected to level-correction by said level-correction means into simultaneous color-difference signals;

(D) second-timing-signal generating means for generating said second timing signals in synchronization with the horizontal scanning period;

(E) first-timing-signal generating means for generating said first timing signals by the use of said second timing signals generated by said second-timing-signal generating means; and (F) control means, arranged to input said discrimination signal output from said discrimination means, for determining whether there is any abnormality in said color-difference line-sequential signal on the basis of said discrimination signal, and for controlling said second-timing-signal generating means according to the result of determination.

7. A color-difference line-sequential signal processing apparatus according to claim 6, wherein said discrimination means includes:

(A) first sampling and holding means, arranged to input said color-difference line-sequential signal, for sampling said color-difference line-sequential signal at each of first sampling timings synchronous with said first timing signals, and for holding the sampled signal level till the next sampling timing;

(B) second sampling and holding means, arranged to input said color-difference line-sequential signal, for sampling said color-difference line-sequential signal at each of second sampling timings synchronous with said first timing signals and different in phase from said first ampling timings, and for holding the sampled signal level till the next sampling timing; and (C) level comparing means for comparing the signal level held by said first sampling and holding means with the signal level held by said second sampling and holding means, and for determining, according to the result of comparison, which of said first color-difference signal and said second color-difference signal has just been sampled and held by each of said first and second sampling and holding means, to output an indication signal in accordance with the result of determination.

8. A color-difference line-sequential signal processing apparatus according to claim 6, wherein said level correction means includes:
    (A) first clamping means, arranged to input said color-difference line-sequential signal, for clamping said color-difference line-sequential signal at first clamping timings synchronous with said first timing signals, and for outputting the thus clamped signal; and
    (B) second clamping means, arranged to input said color-difference line-sequential signal, for clamping said color-difference line-sequential signal at second clamping timings synchronous with said first timing signals and different in phase from said first clamping timings, and for outputting the thus clamped signal.

9. A color-difference line-sequential signal processing apparatus according to claim 8, wherein said simultaneous conversion means includes:
    (A) first switching and outputting means for alternately outputting a signal output from said first clamping means and a signal output from said second clamping means, in synchronization with one of said second timing signals;
    (B) delay means for delaying, one horizontal scanning period, a signal output from said first switching and outputting means, and for outputting the thus delayed signal;
    (C) second switching and outputting means for alternately outputting a signal output from said first switching and outputting means and a signal output from said delay means, in synchronization with said one of said second timing signals; and
    (D) third switching and outputting means, arranged to input a signal output from said first switching and outputting means and a signal output from said delay means, for outputting, in synchronization with said one of said second timing signals, said signal output from said delay means during a period in which said second switching and outputting means outputs said signal output from said first switching and outputting means, and said signal output from said first switching and outputting means during a period in which said second switching and outputting means outputs said signal output from said delay means.

10. A color-difference line-sequential signal processing apparatus according to claim 6, wherein said first-timing-signal generating means includes third-timing-signal generating means for generating a third timing signal synchronous with the horizontal scanning period and different in phase from the horizontal scanning period, said first-timing-signal generating means being arranged to form said first timing signals by the use of said second timing signals generated by said second-timing-signal generating means and said third timing signal generated by said third-timing-signal generating means, and to generate the thus formed first timing signals.

* * * * *